(12) United States Patent
Fukuda et al.

(10) Patent No.: US 7,365,497 B2
(45) Date of Patent: Apr. 29, 2008

(54) DISCHARGE LAMP IGNITION DEVICE AND PROJECTOR

(75) Inventors: Minoru Fukuda, Himeji (JP); Masashi Okamoto, Himeji (JP); Mitsuo Horikoshi, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/622,562

(22) Filed: Jan. 12, 2007

(65) Prior Publication Data
US 2007/0164688 A1    Jul. 19, 2007

(30) Foreign Application Priority Data
Jan. 13, 2006    (JP)    ............... 2006-005463

(51) Int. Cl.
*H05B 37/02*    (2006.01)
(52) U.S. Cl. .................. 315/209 T; 315/226; 315/308; 315/360; 353/85
(58) Field of Classification Search ............ 315/209 R, 315/224, 225, 226, 209 CD, 209 T, 246, 315/247, 276, 277, 283, 289, 291, 307, 308, 315/360; 353/85
See application file for complete search history.

(56) References Cited
U.S. PATENT DOCUMENTS
6,333,607 B1    12/2001    Yamamoto et al.    ......... 315/307
6,759,811 B2 *    7/2004    Okamoto et al.    ........... 315/291
6,967,449 B2    11/2005    Ishihara et al.    ............. 315/307
7,138,769 B2 *    11/2006    Suzuki et al.    ............... 315/289
7,239,089 B2 *    7/2007    Suzuki et al.    ........... 315/209 R FOREIGN PATENT DOCUMENTS
JP    11-283766 A    10/1999
JP    2005-71630 A    3/2005

\* cited by examiner

*Primary Examiner*—Thuy Vinh Tran
(74) *Attorney, Agent, or Firm*—David S. Safran

(57) ABSTRACT

To avoid the phenomenon of unsightly flickering in images projected by the projector, in high pressure discharge lamps—especially in high intensity discharge lamps, such as high pressure mercury lamps, metal halide lamps, and xenon lamps—that are used in projectors, even in the presence of the phenomenon of cyclical modulation of the lamp voltage by the returning the light spectrum when the light reflected by the dynamic color filter returns back through the optical system to the lamp, at least during steady operation of the discharge lamp (Ld), a target lamp current signal generation circuit (Up) acquires multiple lamp voltage detection signal (Sv) over a period that is at least as long as the color order cycle of the dynamic color filter (Of) and generates a target lamp current signal (St) based on the multiple lamp voltage detection signals (Sv) that were acquired.

17 Claims, 5 Drawing Sheets

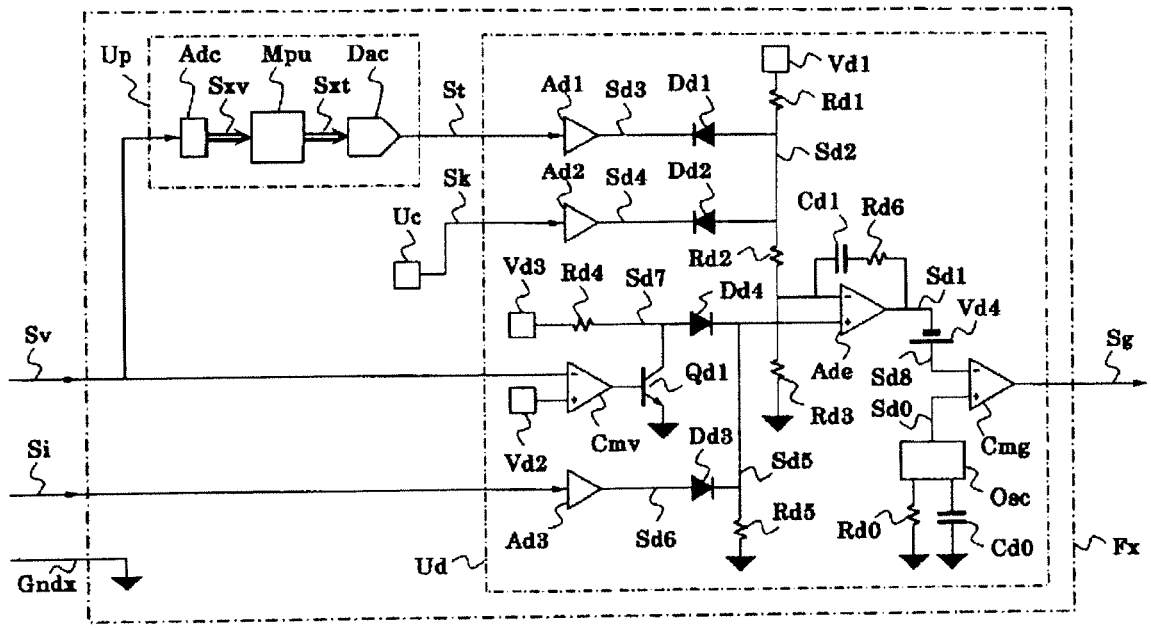
Fig. 3
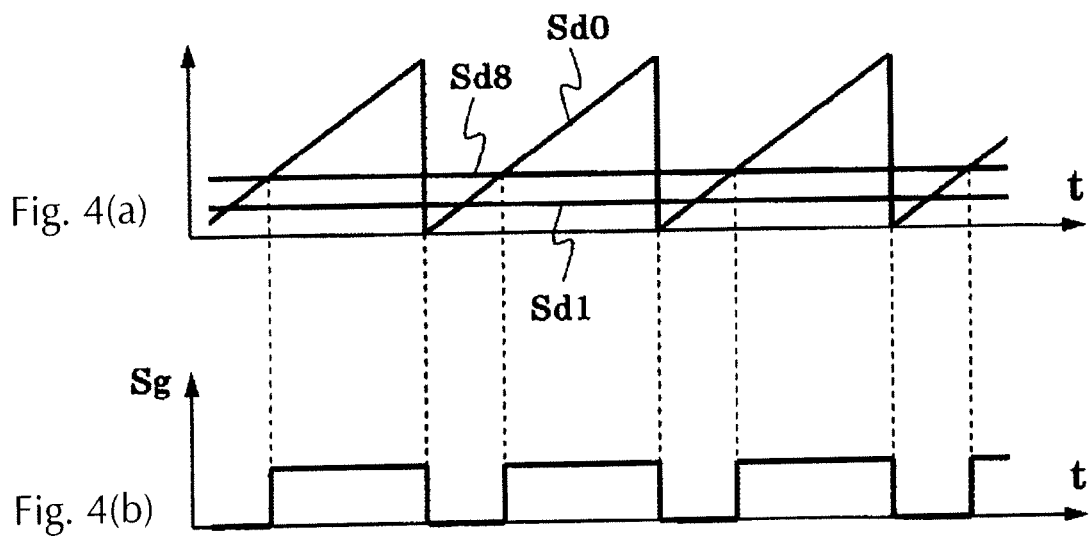
Fig. 4(a)
Fig. 4(b)

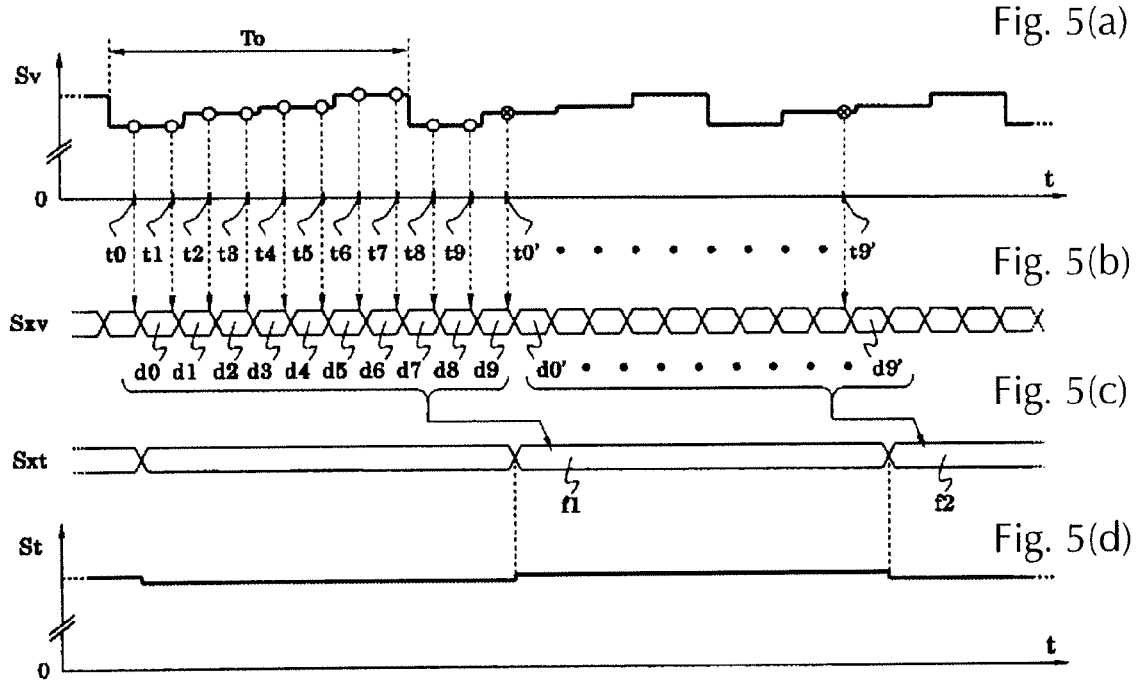
Fig. 5(a)
Fig. 5(b)
Fig. 5(c)
Fig. 5(d)
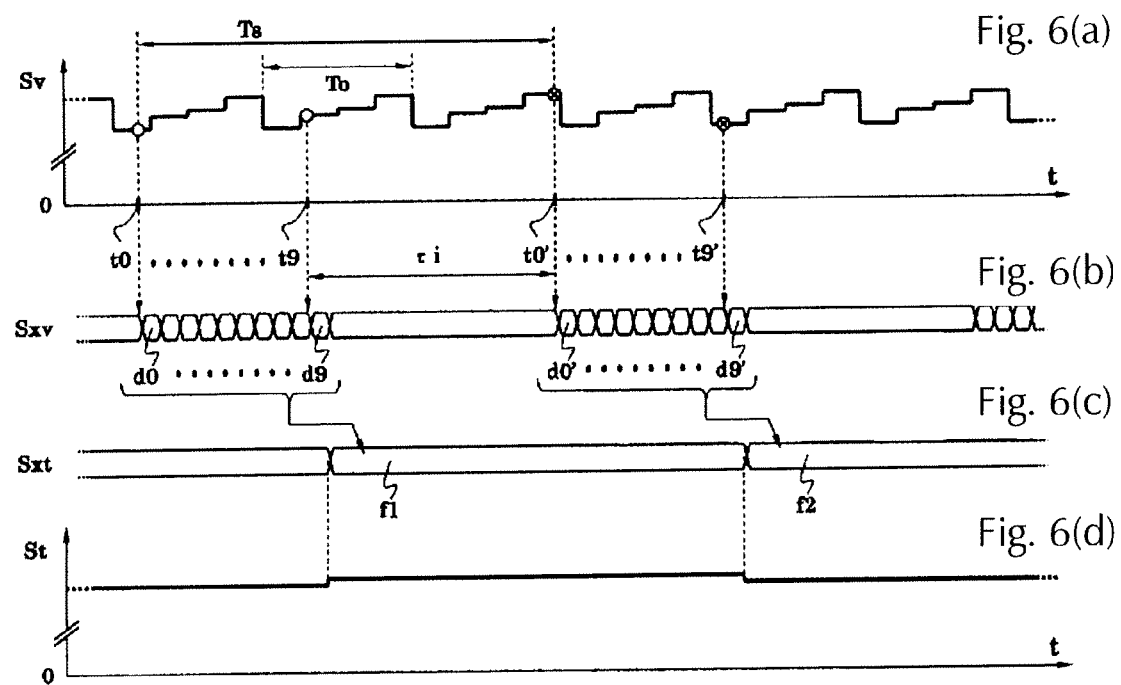
Fig. 6(a)
Fig. 6(b)
Fig. 6(c)
Fig. 6(d)

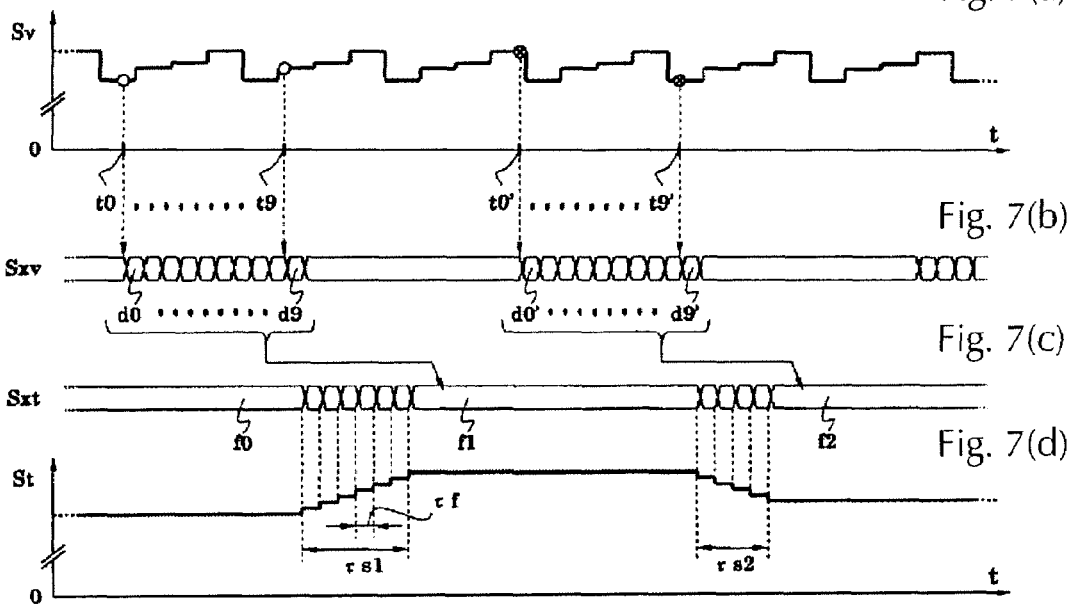
Fig. 7(a)
Fig. 7(b)
Fig. 7(c)
Fig. 7(d)
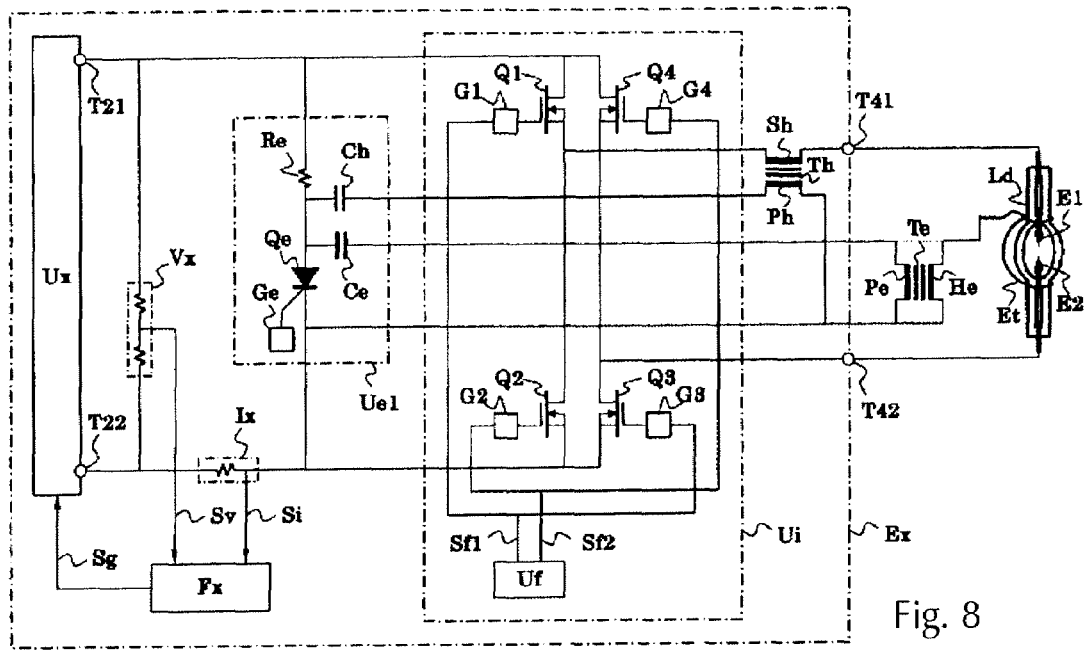
Fig. 8

DISCHARGE LAMP IGNITION DEVICE AND PROJECTOR

BACKGROUND OF THE INVENTION

1. Field of the Invention

The invention is directed to discharge lamp ignition devices for starting high pressure discharge lamps used in projectors, particularly, mercury lamps, metal halide lamps, and xenon lamps, and projectors using such discharge lamp ignition devices.

2. Description of Related Art

High intensity discharge lamps (HID lamps) are used in projectors for optical equipment used for displaying graphic images, such as liquid crystal projectors and DLP® projectors. One method used in these projectors for displaying color images is to split the three colors—red (R), green (G), and blue (B)—using a dichromic prism or other means, generate three separate images with a space modulation element for each color, and then recombine the light paths using a dichromic prism or other means. Another method for displaying color images is to use a spin filter which is a dynamic color filter that comprises a color wheel that passes the three primary colors (R, G, B), sequentially to generate three colored luminous fluxes by passing light from the light source through this filter, and then, sequentially generate images in the three colors by time division by means of controlling a space modulation element in synchronization with the filter.

Among the discharge lamp ignition devices that start the discharge lamps described above, there are those which, with the voltage called the no-load discharge voltage impressed on the lamp at startup, impress a high voltage to generate dielectric breakdown within the discharge space to first bring about a glow discharge, then an arc discharge, and finally, a stable steady voltage. The lamp discharge voltage, which is a low value of perhaps 10 V at the time of transition to arc discharge, gradually increases as the temperature rises and stabilizes at a constant voltage in a state of constant lighting. Discharge lamp ignition devices normally have converters that match the output of the input power supply to the discharge voltage of the lamp so that the lamp current necessary to achieve the desired power of the lamp can be output; moreover, there is an arrangement to detect the lamp voltage or converter output voltage, and on the basis of that information, to determine the target lamp current from the quotient value of dividing the target voltage by the detected voltage.

As for methods of driving discharge lamps, there is the direct current drive method in which the lamp is lighted by the converter, and the alternating current drive method in which an inverter for cyclical reversal of polarity is provided at a stage subsequent to the converter. The direct current drive method has a great advantage in that the luminous flux from the lamp is of the direct current type and does not vary with time, and so it is basically possible to apply it in just the same way to both types of projectors described above. The alternating current drive method, on the other hand, has the advantage of using the freedom not found with the direct current drive method of polarity reversal frequency, and so it is possible to control the wear and service life of the discharge lamp electrodes, but there is also a disadvantage, as described below, that arises from the very existence of polarity reversal.

Normally, every reversal of polarity in alternating current drive causes a slight variation in lamp current or an extreme phenomenon, such as delayed change or overshoot, and this appears almost without moderation as a flicker in luminous flux from the lamp or a fluctuation, such as overshoot or vibration. Consequently, if it is applied to the projectors described above that use the time division method, there is the problem that the timing with which the images are produced in succession by time division will not match the timing of the polarity reversals of the lamp's alternating current drive and fluctuation of the display image will appear at the beat frequency; depending on the frequency of the beats, this can be very unsightly. It has been necessary, therefore, to devise some way to synchronize the timing of the inverter's reversal of polarity with the rotation of the color wheel, which has the drawback of complicating the discharge lamp ignition device.

In projectors using the DLP method, moreover, the brightness of each color of each pixel of the display image is controlled by the duty cycle of the individual pixel of the space modulation element. With the alternating current drive method, therefore, even if the timing is synchronized, if there is a long period of overshoot, vibration, or other fluctuation of the luminous flux when the polarity is reversed, it becomes necessary to devise either a way to not use the light during that period or a way to control the operation of each pixel of the space modulation element to suppress the fluctuation. The former course has the drawback of lowering the effective efficiency of the light beam, and the latter course has the drawback of greatly complicating the control of the space modulation element in the projector equipment.

Incidentally, the present inventors discovered one more problem that sometimes occurs in projectors using the time division method, whether of the direct current drive type or the alternating current drive type. That is, it has been found that the light beam's spectrum component that does not pass through the color wheel—that is, the spectrum component that is complementary to the light beam that passes through—will be reflected by the color wheel; depending on the arrangement of the lamp and the color wheel within the optical system, the light beam may be returned back through the optical system to the lamp and focused on the discharge plasma component or the electrode that faces it. This will generate the phenomenon of the lamp voltage being lowered or modulated by the returning light beam. Further, because the amount of modulation of the lamp voltage will vary with the spectrum of the returning light, there will be a cyclical fluctuation of the amount of modulation of the lamp voltage as the color wheel rotates.

The amount of modulation of lamp voltage is greatest when the transmitted color is red (R), followed by green (G) and blue (B) in that order. If the color wheel has a region that allows all colors—white light—to pass through, there will be very little returning light in that position and so there will be almost no modulation of the lamp voltage. For example, the effect was measured by constructing a DLP projector optical system with a high pressure mercury lamp in which the discharge space in a bulb made of quartz glass contained from 0.15 to 3.0 mg of mercury and was filled with bromine and argon gases, the electrodes were tungsten, the rated power was 200 W and the lamp voltage when burning steadily was 85 V. The result was that the amount of modulation was about 3% when the transmitted color was red and about 0% when the transmitted color was white.

The problem is that the fluctuation of lamp voltage due to the returning light does not correspond to the power actually introduced into the discharge plasma space, but to the apparent voltage between the electrodes measured from outside the lamp. The inter-electrode voltage measured from the outside has a component that depends on the power introduced into the discharge plasma space (which contributes to luminescence) and a cathode fall component that does not depend on the introduced power (which does not contribute to luminescence); the reason that the apparent modulation of lamp voltage is produced is thought to be that the phenomenon is relatively moderate and appears even when the fluctuating returning light only affects the former component, but when the effect extends to the latter component, because of the relatively rapid phenomenon of surface heating of the electrodes by irradiation with light, the state of electrode surface heating is manifest almost as it occurs.

Because the modulating of lamp voltage by the fluctuating returning light is apparent, as described above, if the target lamp current is determined purely on the basis of the lamp voltage, which is the converter output voltage, then the lamp voltage will not be a fixed value with the desired stability, but under the influence of the modulation of lamp voltage by the returning light beam it will have a waveform overlaid with a cyclical fluctuating component. For that reason, the luminous flux emitted from the lamp will similarly be overlaid with a cyclical fluctuating component, containing fluctuations arising from modulation of the lamp voltage by the returning light beam, which will have an adverse impact on the uniformity of the brightness of the images projected by the projector.

At this point, it may be thought that, because rotation of the color wheel is synchronized with control of the space modulation element, even though there is fluctuation of the luminous flux arising from modulation of the lamp voltage by the returning light beam, that fluctuation will also be synchronized with the rotation of the color wheel, and that because of synchronization with control of the space modulation element, the impact on the images projected by the projector will be negligible, appearing only as a slight infidelity of the display colors.

However, with discharge lamp ignition devices of the alternating current drive type, if there is a discrepancy in the timing of this fluctuation and the polarity reversal of the alternating current drive, then, an unsightly flicker at the beat frequency will appear in the image projected by the projector. Further, with either alternating current drive or direct current drive, unless the operation to detect the lamp voltage and determine the target lamp current is synchronized with the rotation of the color wheel, this fluctuation will become an unrecoverable jitter with respect to rotation of the color wheel and cause unrecoverable disruption of the results of modulation of pixel brightness by time division by the space modulation element; an unsightly flicker will appear in the images projected by the projector.

Consequently, it is possible that this flickering phenomenon caused by fluctuation of the luminous flux arising from modulation of the lamp voltage by the returning light beam can be avoided by means of both synchronization of the timing of the polarity reversal of the inverter with the rotation of the color wheel and synchronization of the operation to detect the lamp voltage and determine the target lamp current with the rotation of the color wheel.

However, there is always some wobble in the rotation of the color wheel—play in the rotating spindle—and the extent of the play always varies; this means that the constantly varying play will be included in the angle of the color wheel surface. Although this sort of play exists in the surface of the color wheel, the angle of the light beam passing through the color wheel in its fundamental application can be ignored as long as the surfaces of the color wheel can be deemed to be parallel and play in the position of the transmitted light beam can be ignored as long as neither the refractive index nor the thickness is extreme, and so costly measures to improve the wobble precision of the color wheel are not taken.

With regard to the light reflected from the color wheel, however, the angle of reflection of the reflected light beam will be amplified to double the angle of play of the rotating spindle, and so the amount of modulation of the lamp voltage by the returning light beam is not stable, and as a result the fluctuation of luminous flux emitted from the lamp is not stable either. This has an adverse influence on the uniformity of the brightness of the images projected by the projector, including the appearance of an unsightly flicker in the images projected by the projector. It is not possible to completely avoid this adverse influence, even by means of both synchronization of the timing of the polarity reversal of the inverter with the rotation of the color wheel and synchronization of the operation to detect the lamp voltage and determine the target lamp current with the rotation of the color wheel.

Accordingly, in order to assure the high quality of images projected by the projector, it is necessary to prevent fluctuation of the luminous flux arising from modulation of the lamp voltage by the returning light beam. It is understood that, for that reason, if the occurrence of a light beam returning from the dynamic color filter cannot be prevented optically, a means of avoiding the occurrence of this fluctuation must be devised in the mechanism for determining the target lamp current—for example, by devising something in connection with detection of the lamp voltage, which is the converter output voltage. The description above has spoken of the dynamic color filter as a rotating color wheel, but the situation is the same for other types of dynamic color filters, such as rotating color prisms. Techniques including means of detecting the lamp voltage or current have been proposed in the past to achieve stable power control.

For example, Japanese Pre-Grant Patent Publication H10-321388 (U.S. Pat. No. 6,333,607) describes an H-bridge circuit that converts power supplied by a direct current power supply to alternating current and supplies it to a discharge lamp and a means by which to supply the power supplied to the discharge lamp from the direct current power supply; excess voltage is impressed on the lamp at the time of polarity reversal and the lamp voltage is sampled except when the excess voltage is generated, and so there is a means to mask the lamp voltage during the period when the excess voltage is generated.

Also, Japanese Pre-Grant Patent Publication H11-283766 describes a proposal in which, in order to prevent current overshoot immediately after polarity reversal by the inverter and thus eliminate flickering, the power to a high pressure discharge lamp is fixed by providing a current limiting circuit that outputs the direct current voltage, an inverter that changes the direct current to alternating current, a control circuit that calculates the target current on the basis of the discharge lamp voltage, and a holding circuit that provides output by holding the discharge lamp current; the current limiting circuit is controlled so that the discharge lamp current that is output by the holding circuit is matched to the target current.

In addition, Pre-Grant Patent Publication 2004-296119 (U.S. Pat. No. 6,967,449) describes a proposal which, in order to control voltage and current overshoot during polarity reversal of alternating current rectangular waveform voltage and current, provides a converter that outputs power converted to direct current power by switching of the input power, an inverter that converts the direct current power supplied by the converter to alternating current rectangular waveform power and outputs it, and a control portion that includes a power calculation unit, a control target value setting unit, a correction signal generation unit, a converter control signal generation unit, and a pulsewidth control unit. The power calculation unit calculates the power from the voltage detection signal and the current detection signal detected on the converter output side and generates a power detection signal, and the control target value setting unit outputs an output power command value that controls the direct current power to a target value. The converter control signal generation unit is supplied the output power command value, the correction signal, and the power detection signal and outputs a signal corresponding to the error in the power detection signal relative to the output power command signal that has been corrected by the correction signal. The pulsewidth control unit provides pulses to the converter based on the signal from the converter control signal generation unit. Within such an arrangement, the correction signal generation unit generates a correction signal that corrects the output power command value in response to the power detection signal, and thus outputs the correction signal in synchronization with the polarity reversal of the alternating current rectangular waveform power.

Japanese Pre-Grant Patent Publication 2005-071630 describes illuminating equipment that has a controllable direct current power supply, a full-bridge inverter that converts the direct current voltage from the controllable direct current power supply to alternating current voltage, and a means of control that controls the output of the controllable direct current power supply. In order to control the direct current voltage output of the controllable direct current power supply with high precision and enable service life judgments, the means of control samples one or both of the lamp voltage and lamp current at the time of lamp ignition, including the excess portion during polarity reversal, and forms a control signal that it supplies to the controllable direct current power supply.

However, the problem of fluctuation of luminous flux arising from modulation of the lamp voltage by the returning light beam arises from disruption by excessive modulation of the very lamp voltage that is necessary in order to decide the target lamp current, whether or not there are excessive electrical phenomena such as overshoot during polarity reversal, and it has been impossible to solve that problem with existing technology.

SUMMARY OF THE INVENTION

Accordingly, the problem to be solved by the present invention is that of avoiding the phenomenon of unsightly flickering of the images projected by the projector, in projectors that have dynamic color filters, in circumstances where the phenomenon is brought about by the lamp voltage receiving cyclical modulation by the spectrum of the returning light beam when light reflected by the dynamic color filter is returned back through the optical system to the lamp as described above.

The discharge lamp ignition device of this invention is a discharge lamp ignition device for starting and lighting a discharge lamp in a projector that projects and displays images by using a dynamic color filter to replace the luminous flux produced by the discharge lamp with color ordered luminous flux, in which the discharge lamp ignition device has a feeder circuit to supply power to the discharge lamp, a voltage detection means that detects the voltage of the discharge lamp and generates a lamp voltage detection signal, a current detection means that detects the current of the discharge lamp and generates a lamp current detection signal, a target lamp current signal generation circuit that acquires the lamp voltage detection signal and generates a target lamp current signal, and a feeder capacity control circuit that provides feedback control of the feeder circuit so as to minimize the disparity between the target lamp current signal and the lamp current detection signal, and in which, at least during steady operation of the discharge lamp, the target lamp current signal generation circuit acquires multiple lamp voltage detection signals over a period at least as long as the color order cycle of the dynamic color filter and then generates the target lamp current signal on the basis of the multiple lamp voltage detection signals that were acquired.

In accordance with another aspect of the discharge lamp ignition device of this invention, when the target lamp current signal is generated, the operation of refreshing the target lamp current signal begins intermittently while waiting for a period at least as long as the color order cycle of the dynamic color filter and the previously refreshed value is stored during the period until the value is again refreshed.

Another feature of the discharge lamp ignition device of this invention is that, at the time of the refreshing operation noted above, there is a gradual change from the stored value to the refreshed value.

The discharge lamp ignition device of this invention can also have an inverter to reverse the polarity of the voltage impressed on the discharge lamp and provide alternating current drive of the discharge lamp when the lamp voltage detection signal is acquired, the lamp voltage detection signal being acquired in synchronization with the timing of polarity reversal by the inverter. In this regard, the timing of acquisition of the lamp voltage detection signal (Sv) can be obtained immediately prior to the timing of polarity reversal by the inverter.

The discharge lamp ignition device of this invention can have the target lamp current signal generated on the basis of the average value of multiple acquired lamp voltage detection signals. Alternatively, the target lamp current signal can be generated on the basis of the maximum value or the minimum value of multiple acquired lamp voltage detection signals.

According to another aspect of the invention, the refreshing operation can be omitted in the event that the difference between the stored value and the value to be refreshed is at or below a minimum value.

The projector of this invention is a projector that projects and displays images by using a dynamic color filter to replace the luminous flux produced by the discharge lamp with color ordered luminous flux, in which the discharge lamp ignition device for starting and lighting the discharge lamp is a discharge lamp ignition device (Ex) as described above and in further detail below.

EFFECT OF THE INVENTION

With the invention, at least during steady operation of the discharge lamp, the target lamp current signal generation circuit acquires multiple lamp voltage detection signals over a period at least as long as the color order cycle of the dynamic color filter and then generates the target lamp current signal on the basis of the multiple lamp voltage detection signals that were acquired. The lamp voltage information that is referenced in order to generate the target lamp current signal is indifferent to the amount of modulation of the lamp voltage corresponding to the returning light spectrum, and as a result, it is possible to provide a discharge lamp ignition device that succeeds in avoiding the phenomenon of unsightly flickering of images projected by the projector, even in the presence of the phenomenon of cyclical modulation of the lamp voltage by the returning light spectrum when light reflected by the dynamic color filter returns back through the optical system to the lamp.

When the target lamp current signal is generated, the operation of refreshing the target lamp current signal begins intermittently while waiting for a period at least as long as the color order cycle of the dynamic color filter and the previously refreshed value is stored during the period until the value is again refreshed, and as a result, it is possible to provide a discharge lamp ignition device that succeeds in simplifying processes by reducing the frequency of generation of target lamp current detection signals.

At the time of the refreshing operation, there is a gradual change from the stored value to the refreshed value, and as a result, it is possible to provide a discharge lamp ignition device that succeeds in stopping abrupt changes in lamp brightness and smoothing out the changes, even when there is a discrepancy between the target lamp current signal that has been decided and the target lamp current signal that was decided in the previous refresh operation.

When the lamp voltage detection signal is acquired, the lamp voltage detection signal is acquired in synchronization with the timing of polarity reversal by the inverter, so that the lamp voltage detection signal acquisition operation is reproduced even when excessive phenomena, such as overshoot occur in the lamp voltage or current during polarity reversal, and as a result, it is possible to provide a discharge lamp ignition device that succeeds in suppressing the effect of the excessive phenomena.

By having the timing of acquisition of the lamp voltage detection signal immediately prior to the timing of polarity reversal by the inverter, as a result, it is possible to provide a discharge lamp ignition device that succeeds in minimizing the effect of the excessive phenomena described above.

When the target lamp current signal is generated on the basis of the average value of multiple acquired lamp voltage detection signals, as a result, it is possible to provide a discharge lamp ignition device that succeeds in stable decision of target lamp current signals, with little discrepancy between the target lamp current signal that has been decided and the target lamp current signal that was decided in the previous refresh operation.

If the target lamp current signal is generated on the basis of the maximum value or the minimum value of multiple acquired lamp voltage detection signals, as a result, it is possible to provide a discharge lamp ignition device that succeeds in deciding the value of the target lamp current signal by a simple process.

When the refreshing operation is omitted in the event that the difference between the stored value and the value to be refreshed is at or below a minimum value, as a result, it is possible to provide a discharge lamp ignition device that succeeds in very stable control of lamp current and inhibition of target lamp current signal value refresh operations that are unnecessary or not urgent.

The discharge lamp ignition device of this invention for starting and lighting the discharge lamp makes it is possible to provide a projector that succeeds in avoiding the phenomenon of unsightly flickering of images projected.

As stated above, with this invention, it is possible to avoid the phenomenon of unsightly flickering of images projected by the projector, even in the presence of the phenomenon of cyclical modulation of the lamp voltage by the returning light spectrum when light reflected by the dynamic color filter returns back through the optical system to the lamp.

BRIEF DESCRIPTION OF THE DRAWINGS

FIG. 3 is a diagram showing, in simplified form, a portion of an embodiment of the discharge lamp ignition device of this invention;

FIGS. 4(*a*) & 4(*b*) are timing diagrams showing, in simplified form, a portion of the operation of an embodiment of the discharge lamp ignition device of this invention;

FIGS. 5(*a*)-5(*d*) are timing charts showing, in simplified form, a portion of the operation of an embodiment of the discharge lamp ignition device of this invention;

FIGS. 6(*a*)-6(*d*) are timing charts showing, in simplified form, a portion the operation of another embodiment of the discharge lamp ignition device of the present invention;

FIGS. 7(*a*)-7(*d*) are timing charts showing, in simplified form, another mode of operation of an embodiment of the discharge lamp ignition device of this invention;

FIG. 8 is a diagram showing, in simplified form, another embodiment of the discharge lamp ignition device of this invention.

DETAILED DESCRIPTION OF THE INVENTION

Figure 1:
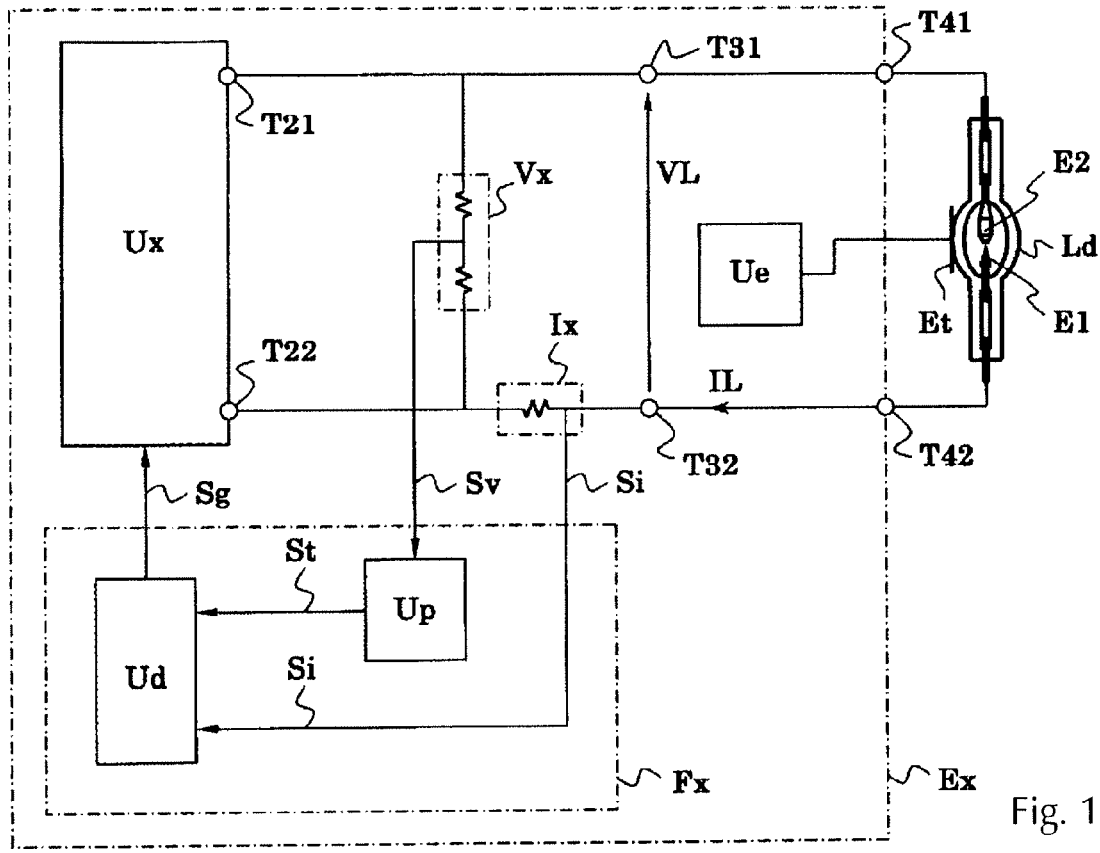
FIG. 1 is a block diagram showing the discharge lamp ignition device of the invention in simplified form.

A first of embodiment of a discharge lamp ignition device in accordance with the invention is shown in FIG. 1 as having a discharge lamp Ld that is connected to a starter Ue for initiating discharge. This figure shows the case of use of the external trigger method, in which high voltage is impressed on an auxiliary electrode Et outside the sealed case of the discharge lamp Ld. The substance of this invention is, however, unrelated to the triggering method used or the location of the means for triggering ignition.

A feeder circuit Ux comprises such things as switching circuits of a step-down chopper or step-up chopper type, is connected so as to output a voltage and current that matches the condition or lighting sequence of the discharge lamp Ld and feed it to the discharge lamp Ld through the main discharge electrodes E1, E2 of the discharge lamp Ld. Now, the voltage that the feeder circuit Ux puts out as the no-load release voltage is typically from 200 to 300 V; the lamp voltage during glow discharge is typically from 100 to 200 V, and the lamp voltage immediately after the transition to arc discharge is about 10 V. It is preferable to control the feeder circuit so that the current flowing during glow discharge and arc discharge will not exceed the prescribed current limiting value ILmax.

Because of the low lamp voltage immediately after the transition to arc discharge, it is not possible to introduce the prescribed power into the lamp within the range of the prescribed current limiting value ILmax, but as the temperature of the lamp increases, the lamp voltage will increase gradually and it will become possible to introduce the prescribed power into the lamp within the range of the prescribed current limiting value ILmax; this can be accomplished by an action to set the target lamp current for the prescribed power level in accordance with the lamp voltage. This action continues thereafter, even after the lamp voltage has stabilized and the lamp has entered steady operation.

To bring about this action, the output current of the feeder circuit, which is also the lamp current IL, is detected by the means of lamp current detector Ix and a lamp current detection signal Si is generated and output. The lamp current detection signal Si and that signal's control target value, the target lamp current signal St, are input to the feed capacity control circuit Ud, and the two signals are compared by a feed capacity control circuit Ud. Then, the lamp current IL is increased if the lamp current detection signal Si is smaller than the target lamp current signal St, or the lamp current IL is decreased if the lamp current detection signal Si is larger than the target lamp current signal St; this is done by means of feedback control of the gate drive signal Sg output to the feeder circuit Ux until the lamp current detection signal Si and the target lamp current signal St match.

On the other hand, the output voltage of the feeder circuit Ux, which is also the lamp voltage VL, is detected by the means of lamp voltage detector Vx and a lamp current detection signal Sv is generated and input to the lamp current signal generation circuit Up. The lamp current signal generation circuit Up, using the lamp voltage detection signal Sv, decides and refreshes the target lamp current signal St so that the lamp power value introduced into the discharge lamp Ld will be the previously determined target value.

The target lamp current signal generation circuit Up is constituted so that, at least during steady operation of the discharge lamp Ld, when the target lamp current signal St is to be decided, multiple lamp voltage detection signals Sv are acquired over a period that is at least as long as the color order cycle of the dynamic color filter, a representative lamp voltage detection signal Sv is generated from the multiple signals that were acquired, and then the target lamp current signal St is generated.

By means of this constitution, the lamp voltage information that is referenced to generate the target lamp current signal is indifferent to the amount of modulation of the lamp voltage corresponding to the returning light spectrum, and as a result, it is possible to provide a discharge lamp ignition device that succeeds in avoiding the phenomenon of unsightly flickering of images projected by the projector, even in the presence of the phenomenon of cyclical modulation of the lamp voltage by the returning light spectrum when light reflected by the dynamic color filter returns back through the optical system to the lamp.

Next, an embodiment of this invention will be explained with reference to FIG. 2 that shows a discharge lamp ignition device Ex using the DC driving method.

In the discharge lamp ignition device Ex of this invention, the feeder circuit Ux on a step-down chopper substrate acts on receipt of a voltage supply from a PFC or other DC power supply Mx and regulates the amount of power fed to the discharge lamp Ld. The feeder circuit Ux is constituted such that the current from the DC power supply Mx is turned ON or OFF by an FET or other switching element; after passing through a choke coil Lx to charge a smoothing capacitor Cx, the voltage is impressed on the discharge lamp Ld and current can flow through the discharge lamp Ld. Now, when the switching element Qx is in the ON state, the current passing through the switching element Qx directly charges the smoothing capacitor Cx and supplies the discharge lamp Ld which is the load, and also stores energy in the choke coil in the form of magnetic flux. When the switching element Qx is in the OFF state, the energy stored in the choke coil in the form of magnetic flux passes through a flywheel diode Dx and supplies current to the discharge lamp Ld.

In a feeder circuit Ux of the step-down chopper type, the amount fed to the discharge lamp can be regulated by means of the duty cycle, which is the ratio of the period during which the switching element Qx is in the ON state to the period that the switching element Qx is in operation. Here, a drive signal Sg with the duty cycle is generated by the feeder control circuit Fx; by passing through the gate drive circuit Gx and controlling the gate terminal of the switching element Qx, this controls the ON or OFF state of current from the DC power supply Mx.

In the trigger circuit Uj, a capacitor Cj is charged with lamp voltage VL through a resistance Rj. For example, when the drive circuit Gj is activated on receipt of a trigger signal Sj generated by a means such as the microprocessor unit Mpu described below, a thyristor or other switching element Qj begins to conduct, so that the capacitor Cj discharges through the primary winding Pj of the transformer Kj and a high voltage pulse is generated in the secondary winding Hj. The high voltage generated in the seconding winding Hj is impressed on the electrodes E1, E2 overlapping the voltage output by the feeder circuit Ux, and it becomes possible for the discharge lamp Ld to begin discharging. The trigger method used by the arrangement shown in this drawing differs from the triggering method used in that of FIG. 1, but as stated above, the triggering method used is unrelated to the substance of this invention.

The lamp current IL that flows between the electrodes of the discharge lamp Ld and the lamp voltage VL generated between the electrodes E1, E2 can be detected by the lamp current detection means Ix and the lamp voltage detection means Vx. Now, the lamp current detection means Ix can be realized using a shunt resistance and the lamp voltage detection means Vx can be realized using a voltage divider. The lamp current detection signal Si from the lamp current detection means Ix and the lamp voltage detection signal Sv from the lamp current detection means Vx are input, respectively, to the feed capacity control circuit Ud and the target lamp current signal generation circuit Up of the feeder control circuit Fx.

Figure 2:
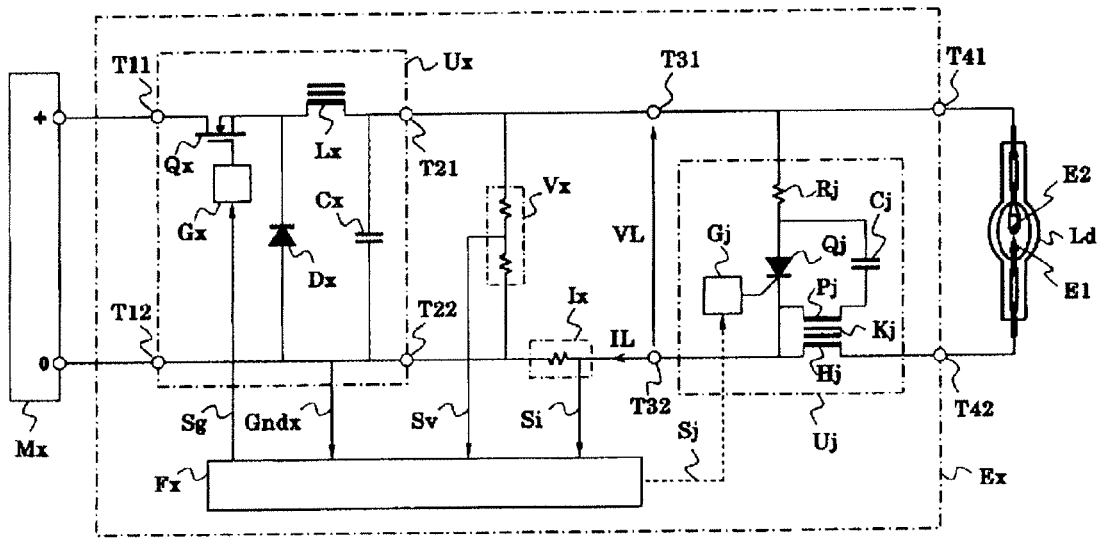
FIG. 2 is a diagram showing, in simplified form, an embodiment of the discharge lamp ignition device of this invention.

FIG. 3 shows in simplified form the constitution of the feeder control circuit Fx described relative to FIG. 2. The lamp voltage detection signal Sv is input to an AD converter Adc within the target lamp current signal generation circuit Up, is converted to digital lamp data Sxv having the appropriate number of digits, and then is input to the microprocessor unit Mpu. Here, the microprocessor unit Mpu includes a CPU and also program memory, data memory, a clock pulse generation unit, a time counter, and an IO controller for input and output of digital signals.

Based on calculation of referenced lamp voltage data Sxv and judgment of conditions corresponding to the condition of the system at that moment, the microprocessor unit Mpu generates target lamp current data Sxt for the feed capacity control circuit Ud, which is described below. Specifically, at least while the lamp is in a state of steady operation, the microprocessor unit Mpu acquires lamp voltage data Sxv through the AD converter Adc at multiple points in time over a period that is at least as long as the color order cycle of the dynamic color filter Of. The microprocessor unit Mpu generates a representative value from the multiple lamp voltage data Sxv that has been acquired and produces the target lamp current data Sxt.

What is called the color order cycle of the dynamic color filter Of here is not necessarily, in the case of a rotating color wheel, one cycle of rotation of the color wheel. That is because there are times that the color wheel is so constituted that the color pattern of one rotation of the color wheel will include two or three repetitions of the color order cycle.

The target lamp current data Sxt is converted to an analog target lamp current signal St by a DA converter Dac and is input to the feed capacity control circuit Ud. Further, the lamp current high limit signal Sk that specifies the permissible lamp current IL maximum value ILmax is generated by the lamp current high limit signal generation circuit Uc and input to the feed capacity control circuit Ud.

Within the feed capacity control circuit Ud, the target lamp current signal St passes through an amplifier or buffer Ad1, if needed, and a diode Dd1, and the lamp current high limit signal Sk also passes through an amplifier or buffer Ad2, if needed, and a diode Dd2; both are connected to one terminal of a pull-up resistance Rd1, and a chopper drive target signal Sd2 is generated. Now, the other terminal of the pull-up resistance Rd1 is connected to a standard voltage source having an appropriate voltage. Consequently, the chopper drive target signal Sd2 is the signal selected as the larger of the signal Sd3 that corresponds to the chopper drive target signal Sd2 and the signal Sd4 that corresponds to the lamp current high limit signal Sk.

In other words, even if the target lamp current signal St generated by the target lamp current signal generation circuit Up is not suitable, the chopper drive output signal Sd2 is constrained by hardware within the feed capacity control circuit Ud so that the lamp current IL will not exceed the lamp current high limit signal Sk.

In this connection, control through the AD converter Adc and the microprocessor unit Mpu is slow (or is fast only at a high cost), and so, if a situation arises, such as an abrupt change in the discharge status of the lamp, the operational slowness may allow generation of an unsuitable target lamp current signal St. Thus, having this type of current limiting function constituted in hardware is advantageous from the perspective of protecting the lamp and the power feed equipment.

The lamp current detection signal Si, on the other hand, passes through an amplifier or buffer Ad3, if needed, and a diode Dd3 and is connected to one terminal of a resistance Rd5 of which the other terminal is connected to the ground Gndx; a control object signal Sd5 is generated.

Additionally, a comparator Cmv compares the lamp voltage detection signal Sv to the voltage of a standard voltage source Vd2 that has a voltage corresponding to the no-load release voltage. If the lamp voltage detection signal Sv is higher than the no-load release voltage, a transistor Qd1 will be in an OFF or active state, and current will flow from an appropriate voltage source Vd3 through a resistance Rd4 and a diode Dd4 to a pull-down resistance and will act to raise the level of the control object signal Sd5. If, on the other hand, the lamp voltage detection signal Sv is lower than the no-load release voltage, the transistor Qd1 will be in an ON state, so that current from the voltage source Vd3 will be short circuited and the control object signal Sd5 will correspond to the lamp current detection signal. That is because the circuit comprising the pull-down resistance Rd5, the diode Dd3 and the diode Dd4 selects the lesser voltage of the signals Sd6 and Sd7 on the anode sides of the two diodes and provides it to a pull-down resistance Rd5.

Because of this constitution, even if the output current is almost completely stopped and the current detection signal Si entering is very low, the lamp voltage detection signal Sv will be higher than the no-load release voltage and the control object signal Sd5 will increase rapidly, so the lamp voltage VL will always be limited by hardware to a level roughly below the no-load release voltage.

The chopper drive target signal Sd2 is voltage divided by a resistance Rd2 and a resistance Rd3, and is input to the reverse input terminal of an operational amplifier Ade. The control object signal Sd5, on the other hand, is input to the non-reverse input terminal of the operational amplifier Ade. Then, the output signal Sd1 from the operational amplifier Ade is fed back to the reverse input terminal through a integrating capacitor Cd1 and a speed-up resistance Rd6. As a result, the operational amplifier Ade works as an error integration circuit that integrates the difference of voltage of the control object signal Sd5 with respect to the chopper drive target signal Sd2 voltage divided by the resistance Rd2 and the resistance Rd3.

The oscillator, connected to a resistance Rd0 and a capacitor Cd0, generates a sawtooth wave signal Sd0, as shown in FIG. 4($a$), to decide the time constant, and this sawtooth wave signal Sd0 and the error integration circuit output signal Sd1 are compared by a comparator Cmg. However, when this comparison is made, it is a signal Sd8 which is the error integration circuit output signal Sd1 augmented by an offset voltage Vd4 that is compared with the sawtooth wave signal Sd0. When the voltage of the sawtooth wave signal Sd0 is higher than the voltage of the signal Sd8, the high level gate drive signal Sg is generated and output from the feed capacity control circuit Ud.

As described above, the signal Sd8 is the error integration circuit output signal Sd1 augmented by an offset, and so, even if the error integration circuit output signal Sd1 is zero, the duty cycle of the gate drive signal Sg will be a maximum value less than 100%, that is, no greater than the maximum duty cycle DXmax. FIGS. 4($a$) & 4($b$) show the relationship among the offset augmented signal Sd8, the sawtooth wave signal Sd0, and the gate drive signal Sg.

The gate drive signal Sg output by the feed control circuit Fx is input to the gate drive circuit Gx, and as a result, the lamp current detection signal S9 and the lamp voltage detection signal Sv are fed back by the action of the switching element Qx, and complete the feedback control system. Now, with regard to the constitution of the feed capacity control circuit Ud described in FIG. 3, it is possible to use a commercially available integrated circuit, such as model TL494 from Texas Instruments Inc., which integrates an operational amplifier Ade, oscillator Osc, comparator Cmg and other components.

The operation of the discharge lamp Ld ignition device of this invention, which is constituted as described above, is explained here on the basis of FIG. 5, which is a time chart that shows the operating mode as a time series. FIG. 5($a$) shows conceptually the waveform of the lamp voltage detection signal Sv. It is basically analogous to the voltage of the discharge lamp Ld. The figure depicts in a stylized manner the fluctuation of the lamp voltage detection signal Sv under the influence of lamp voltage modulation arising from light returning to the lamp from the dynamic color filter.

As shown in FIG. 5($b$), the target lamp current signal generation circuit Up acquires ten lamp voltage data values d0 to d9 as digital lamp voltage data Sv values at ten different points in time (t0 to t9) as the lamp voltage detection signal Sv passes through the AD converter Adc. Here, the time gap between the first point in time t0 and the last t9 is at least as long as the color order cycle To of the dynamic color filter Of.

On the basis of the lamp voltage data values d0 to d9, the target lamp current signal generation circuit Up generates a representative value and, as shown in FIG. 5(c), generates a target lamp current data value f1 as a target lamp current data value Sxt. Then, as shown in FIG. 5(d), it is converted to an analog target lamp current signal St by the DA converter Dac and input to the feed capacity control circuit Ud.

Because the generation of target lamp current signals St in the target lamp current signal generation circuit Up is performed in this way, the lamp voltage information that is referenced in order to generate the target lamp current signal will be unaffected by the amount of modulation of lamp voltages by the various spectra of returning light beams, and so the modulation component included in the lamp voltage detection signal Sv will not be included in the target lamp current signal St.

In the operation shown in FIGS. 5(a)-5(d), the target lamp current signal generation circuit Up, in order to generate a second target lamp current data value f2 after generation of the first target lamp current data value f1, is depicted as beginning to acquire lamp voltage data values d0' to d9' at the time points t0' to t9' following the last point t9 of the previous cycle. However, it is also possible to distribute the first time point t0' for acquisition of data values for the second cycle at a time prior to the last time point t9 of the first cycle. In this case, the lamp voltage data values d0' to d8' will use the lamp voltage data values d1 to d9 without change, and so only the lamp voltage data value d9' has to be newly acquired through the AD converter Adc; accordingly, the target lamp current data value f2 can use a moving data reference method with a value based on the lamp voltage data values d1 to d9 and the lamp voltage data value d9'.

Further, as shown in FIGS. 6(a)-6(d), which is a time chart that shows another mode of operation of the discharge lamp ignition device of this invention as a time series (the quantities in (a), (b), (c), and (d) of these figures are the same as in FIGS. 5(a)-5(d)), after generation of the target lamp current data value f1, there can be a pause τi between the final point in time t9 and the first point in time t0' used to generate the following target lamp current data value f2. In other words, it is possible to have a refresh operation period Ts that is as long as or longer than the color order cycle of the dynamic color filter Of and to start target lamp voltage signal St value refresh operations intermittently.

By doing this, it is possible to simplify the process by reducing the frequency of generation of target lamp current signals, and to reduce the processing burden on the target lamp current signal generation circuit Up.

Further, as shown in FIGS. 7(a)-7(d), which is a time chart that shows another mode of operation of the discharge lamp ignition device of this invention as a time series (the quantities in (a), (b), (c), and (d) of these figures are the same as in FIGS. 5(a)-5(d), during the target lamp voltage signal St value refresh operation, it is possible to refresh by gradually changing from the stored value to the refreshed value.

In this mode, when the target lamp current signal generation circuit Up generates the target lamp current data value f1, if that value differs from the target lamp current data value f0 of the previous refresh operation, the target lamp current data value Sxt will be changed from the target lamp current data value f0 to the target lamp current data value f1 in a number of finite difference steps over the change time interval Tf. Similarly, when the next target lamp current data value f2 is generated, if that value differs from the target lamp current data value f1 of the previous refresh operation, the target lamp current data value Sxt will be changed from the target lamp current data value f1 to the target lamp current data value f2 in a number of finite difference steps over the change time interval τf.

By this means, if there is a difference between the target lamp current signal value that has been decided and the target lamp current signal value that was decided in the previous refresh cycle, it will be possible to change smoothly, preventing an abrupt change in the brightness of the lamp. Now, for the length of the change time interval τf and the size of the finite difference steps use for gradual changes, it is possible to select suitable values that will change the lamp's brightness smoothly and not cause visible difficulties. Further, in the mode shown in FIG. 7(a)-7(d), the change times τs1, τs2 vary with the size of the difference between the target lamp current data values, but it is permissible to regulate the rate of change during the gradual changes in order to fix the length of the change times τs1, τs2.

A mode of implementing this invention is explained here using FIG. 8, which shows in simplified form one form of the discharge lamp ignition device of this invention. The explanation to this point has focused on the direct current drive mode of discharge lamp ignition device, but one merit of this invention is that it can be applied to the alternating current drive mode of discharge lamp ignition device as well. FIG. 8 shows a configuration with a full-bridge inverter Ui in place following the feeder circuit Ux.

The inverter Ui comprises a full-bridge circuit using FET or other switching elements Q1, Q2, Q3, Q4. Each of the switching elements Q1, Q2, Q3, Q4 is driven by a respective gate drive circuit G1, G2, G3, G4. The gate drive circuits G1, G2, G3, G4 are controlled by inverter control signals Sf1, Sf2 generated by the inverter control circuit Uf such that, in the phase when the diagonal pair of switching elements Q1 and Q3 are in the ON state, the other diagonal pair of switching elements Q2 and Q4 are maintained in the OFF state, and conversely, in the phase when the other diagonal pair of switching elements Q2 and Q4 are in the ON state the diagonal pair of switching elements Q1 and Q3 are maintained in the ON state. At the time of switching between the two phases mentioned above, there will be a period called "dead time" in which the switching elements Q1, Q2, Q3, Q4 are all in the OFF state.

Now, when the switching elements Q1, Q2, Q3, Q4 are MOSFETs, for example, a parasitic diode in the direction from the source terminal to the drain terminal is incorporated in the element itself (not illustrated), but in elements like bipolar transistors where there is no parasitic diode, it is preferable that a diode corresponding to a parasitic diode be connected in a reverse parallel connection. That is, because of the risk of damage to the element from the occurrence of reverse voltage since, at the time of a phase switch or during dead time, there will be a flow of induced current arising from the inductance component that exists in a stage subsequent to the inverter Ui.

In the trigger drive circuit Ue1, a capacitor Ce is charged by the output voltage of the feeder circuit Ux through a resistance Re. For example, when a gate drive circuit Go is activated on receipt of a trigger signal (not shown) generated by a microprocessor unit Mpu described below, a thyristor or other switching element Qe begins to conduct, so that the condenser Qe discharges through the primary winding Pe of a high voltage transformer Te and generates a high voltage pulse in the secondary winding He. The high voltage generated in the secondary winding He is impressed on the auxiliary electrode Et of the discharge lamp Ld, and discharge between the electrodes E1, E2 of the discharge lamp Ld can begin.

Further, when the high voltage transformer Te is operating, a transformer Th is added to augment the no-load release voltage impressed on the electrodes E1, E2 for the discharge, and so the ignition characteristics of the discharge lamp Ld are improved. A capacitor Ch is added to the trigger drive circuit Ce1 and connected to a connection node along with the capacitor Ce, a resistance Re1 and a switching elements Qe; the capacitor Ch is charged through the primary winding Ph of the transformer Th. Accordingly, when a pulsed current flows through the primary winding Pe of the high voltage transformer Te and a high voltage pulse is impressed on the auxiliary electrode Et, a pulsed current similarly flows through the primary winding Ph of the transformer Th and a voltage is generated in the secondary winding Sh, overlaid on the no-load release voltage from the feeder circuit Ux that is impressed on the electrodes E1, E2.

The ignition characteristics of the discharge lamp Ld are improved as a result. Now, it is preferable the inductance values and winding direction of the primary winding Ph and the secondary winding Sh of the transformer Th be set so that the voltage waveform generated in the secondary winding Sh will have optimum timing and polarity for a high voltage pulse impressed on the auxiliary electrode Et.

Now, because the transformer Th is a stage subsequent to the inverter Ui, if the phase of polarity reversal of the inverter Ui and the action of the transformer Th are uncontrolled, the voltage generated in the secondary winding Sh of the transformer Th will be overlaid and the absolute value of the voltage impressed on the electrodes E1, E2 may actually be lowered. Accordingly, so that the transformer Th will operate with a timing that allows the maximum absolute value of the voltage impressed on the electrodes E1, E2, it is possible either to synchronize the trigger signal with the phase of polarity reversal of the inverter Ui, or to stop the polarity reversal action of the inverter Ui at startup under conditions suited to the polarity of voltage generated in the secondary winding Sh.

In a discharge lamp ignition device of the alternating current drive type, it is best to locate the lamp voltage detection means Vx and the lamp current detection means Ix at a stage prior to the inverter Ui, as shown in FIG. 8, to acquire the lamp voltage detection signal Sv and the lamp current detection signal Si as signals corresponding to the absolute values of the lamp voltage and lamp current, respectively.

Figure 9:
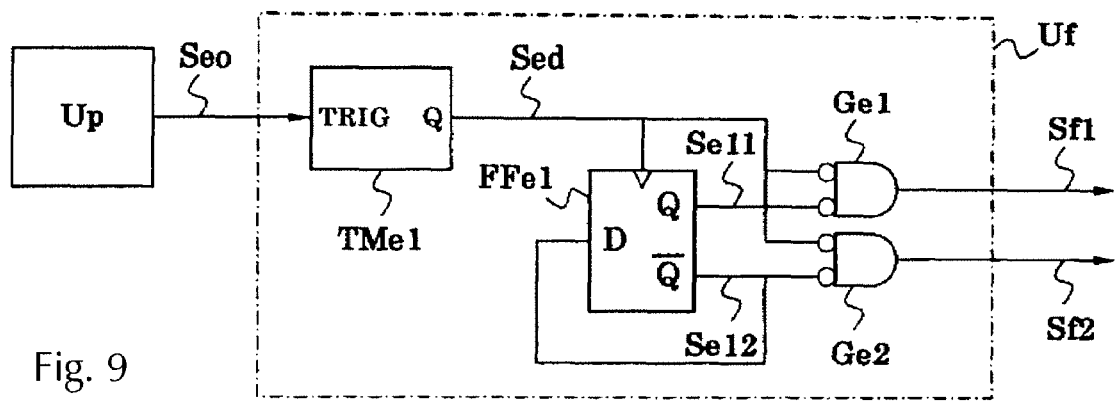
FIG. 9 is a diagram showing, in simplified form, a portion of an embodiment of the discharge lamp ignition device of this invention.

A further embodiment of this invention is explained here using FIG. 9, which is a diagram showing in simplified form a portion of the discharge lamp ignition device of this invention. In a discharge lamp ignition device of the alternating current drive type, as stated above, there is potential for inconvenience in that every time there is a reversal of polarity for the alternating current drive, there can be a delayed change or excessive phenomena in the lamp current, such as overshoot or vibration, and depending on the impedance of the discharge lamp Ld, there may similarly be overshoot or vibration in the voltage, resulting in excessive disruption of the lamp voltage detection signal Sv.

In order to avoid this inconvenience, the target lamp signal generation circuit Up is utilized as shown in FIG. 9: a polarity reversal command signal Seo is generated in the target lamp current signal generation circuit Up, and there is a fixed gap between timing of acquisition of lamp voltage data Sxv that has come through the AD converter Adc and the polarity reversal command signal Seo.

In the inverter control circuit Uf, the polarity reversal command signal Seo is input to a timer circuit TMe1 that is comprised of, for example, a monostable multivibrator, and generates a signal Sed corresponding to the period of dead time. This signal Sed is input to the clock signal input terminal of a delay flip-flop FFe1 which has its input terminal connected to its own reverse output. The output signal of the delay flip-flop FFe1 and the reverse output signal are each input to one input terminal of separate NOR gates Ge1, Ge2, and the signal Sed is input to the other input terminal of the separate NOR gates Ge1, Ge2 to generate the inverter control signals Sf1, Sf2 in connection with the dead time at polarity reversal.

By means of this arrangement, it is possible to synchronize acquisition of the lamp voltage detection signal Sv with the timing of polarity reversal in the inverter Ui and to bring about an operation to acquire the lamp voltage detection signal Sv. To ameliorate the excessive disruption described above, the operation of acquiring the lamp voltage detection signal Sv and the polarity reversal operation are both synchronized, by which means the lamp voltage detection signal acquisition signal operation can be reproduced even in the event that excessive phenomena such as overshoot occur in the lamp voltage and current during polarity reversal.

A construction of the target lamp current signal generation circuit Up such that there is an interval between the timing of acquisition of the lamp voltage data Sxv and the polarity reversal command signal Seo has been described above, but in order to minimize the effect of overshoot or vibration during polarity reversal in proportion to the time passed from the polarity reversal, it is best to time the acquisition of the lamp voltage detection signal Sv immediately prior to polarity reversal in the inverter Ui. It is possible, by this means, to minimize the effect of these excessive phenomena on the lamp voltage detection signals that are acquired.

When the lamp voltage data Sxv—a representative value from the lamp voltage detection signals Sv—is generated, because the target lamp current signal generation circuit Up generates the target lamp current signal St on the basis of the average value of multiple lamp voltage detection signals Sv that have been acquired, it is possible to set a stable target lamp current signal value with little difference between the target lamp current signal value that is decided and the target lamp current signal value that was decided in the previous cycle. In this case, the method of referencing the moving data is what is called moving average calculation.

Further, when generating a representative value from the lamp voltage detection signal Sv, because the target lamp current signal generation circuit Up is constructed so as to generate the target lamp current signal on the basis of either the maximum or minimum value of multiple lamp voltage detection signals Sv that have been acquired, it is possible to decide the value of the target lamp current signal by a simple process.

To generate a representative value from multiple lamp voltage detection signals Sv that have been acquired by a process such as generating an average value based on multiple values or selecting the maximum or minimum value from multiple lamp voltage detection signal Sv is nothing other than an operation to smooth out lamp voltage modulation arising from light returning to the lamp from the dynamic color filter as described relative to FIG. 5(*a*). However, some influence of lamp voltage modulation may remain if the number of lamp voltage detection signals Sv is too small, so if it is desired to completely eliminate that influence, it is necessary to increase the number of lamp voltage detection signals Sv.

In such cases, even if the number of lamp voltage detection signals Sv acquired is not increased, because the target lamp current signal generation circuit Up is constituted so as to skip the refresh operation if the difference between the stored value and the value to be refreshed is below the specified minimum, it is possible to inhibit target lamp current signal value refresh operations that are unnecessary or not urgent and provide very stable lamp current control, almost entirely eliminating the influence of lamp voltage modulation arising from light returning to the lamp from the dynamic color filter.

Even if the refresh operation is omitted, if there is a trend of change, such as a gradual rise or fall of lamp voltage, if the difference between the stored value and the value to be refreshed will gradually increase and eventually a refresh operation will be performed. For that reason, it is possible that slight and temporary errors in lamp power will occur, but the range of such errors can be limited by making the specified minimum value for the difference high enough.

Figure 10:
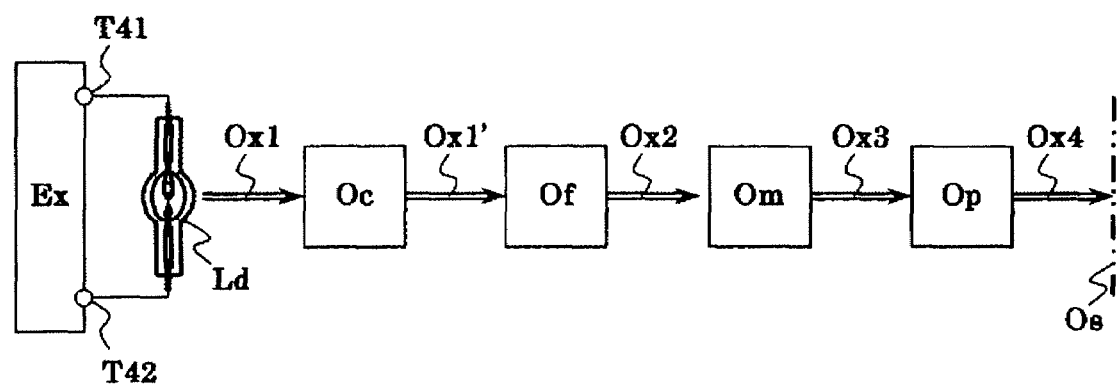
FIG. 10 is a block diagram showing, in simplified form, an embodiment of the projector of the present invention.

FIG. 10 is a block diagram showing, in simplified form, an embodiment of the projector of this invention. The luminous flux Ox1 emitted from a discharge lamp Ld that is started up and kept burning by the discharge lamp ignition device Ex of this invention passes through a condenser optical system Oc, which includes concave lenses, condensing lenses and so on as required, to become luminous flux Ox1' and is transformed to a color ordered luminous flux Ox2 by a rotating color wheel or other dynamic color filter Of. The ordered luminous flux Ox2 is modulated to a color ordered image luminous flux Ox3 by a space modulation element Om that uses DLP® (particularly, Digital Micromirror Device (DMD) technology), LCD, or LCOS (reflective liquid crystal) technology; the projected image is formed by the projection lens Op on a screen that is set up either as a single unit with the projector or external to the projector.

Because the discharge lamp Ld is lit by the ignition device Ex of this invention, it is possible to avoid the phenomenon of an unsightly flicker appearing in the projected image under the influence of modulation of the luminous flux arising from modulation of the lamp voltage due to returning light.

Now, when this invention is implemented and the target lamp current signal generation circuit Up generates the target lamp current signal St, instead of generating the target lamp current signal St on the basis of the average value of multiple lamp voltage detection signals Sv that have been acquired, it is possible, for example, to generate target lamp current signal candidate values for each of the multiple lamp voltage detection signals Sv that has been acquired and then generate the target lamp current signal on the basis of an average of the candidate values.

Further, instead of instead of generating the target lamp current signal St on the basis of the maximum or minimum value of the multiple lamp voltage detection signals Sv that have been acquired, as described above, it is possible, for example, to generate target lamp current signal candidate values for each of the multiple lamp voltage detection signals and then generate the target lamp current signal on the basis of the largest or the smallest of the candidate values.

Further, in the constitution of this invention, there is no objection to using technology to synchronize the color order cycle of the dynamic color filter Of with the timing of polarity reversal in the inverter Ui or with the timing of acquisition of lamp voltage detection signals Sv.

The circuit structure described is the minimum necessary minimum for explaining the operations, functions, and uses of the discharge lamp ignition device of this invention. Accordingly, the premise is that creative devices including the circuit structure, details of operation, and changes to the polarity of signals or the selection, addition, or removal of specific circuit elements for reasons of convenience of obtaining the elements or economic reasons will be devised at the time of designing a particular implementing device.

It is of course possible to add to the various parts of the circuit structure described above, as necessary, such things as mechanisms to protect FET switching elements and other circuit elements from damage caused by excessive voltage, current, or heat, or mechanisms to reduce the generation of conduction noise or emission noise that accompanies the operation of power supply circuit elements or to prevent generated noise from escaping from the equipment, such as snapper circuits, varistors, clamp diodes, current control circuits (including the pulse by pulse method), common mode or normal mode noise filter choke coils, noise filter capacitors and so on. The structure of the discharge lamp ignition device which constitutes this invention is not limited to the circuit types in the description of the invention, nor is it limited by the waveforms and timing charts described.

For example, the target lamp current signal generation circuit Up of the feed control circuit Fx in FIG. 1 has the lamp voltage detection signal Sv that corresponds to the lamp voltage VL undergo AD conversion to become the basis for setting the target lamp current signal St, but it is also possible to have the lamp current detection signal that corresponds to the lamp current IL undergo AD conversion, if the target lamp current signal St is corrected and set so that the current value obtained matches the target current value. This would correct the effect of scattering of various circuit element parameters and improve precision and functionality. Alternatively, the microprocessor unit Mpu could be eliminated and replaced with a simpler control circuit. Such simplification is an example of diversification of the structure of the light source that could improve the effect of this invention.

What is claimed is:

1. A discharge lamp ignition device for starting and lighting a discharge lamp in a projector that projects and displays images using a dynamic color filter to replace the luminous flux produced by the discharge lamp with a color ordered luminous flux, comprising:
   a feeder circuit to supply power to the discharge lamp,
   a voltage detection means that detects the voltage of the discharge lamp and generates a lamp voltage detection signal,
   a current detection means that detects the current of the discharge lamp and generates a lamp current detection signal,
   a target lamp current signal generation circuit that acquires the lamp voltage detection signal and generates a target lamp current signal, and
   a feeder capacity control circuit that provides feedback control of the feeder circuit so as to minimize any disparity between the target lamp current signal and the lamp current detection signal,
   wherein, at least during steady operation of the discharge lamp, the target lamp current signal generation circuit is adapted to acquire multiple lamp voltage detection signals over a period of time that is at least as long as a color order cycle of the dynamic color filter and then generate the target lamp current signal on the basis of the multiple lamp voltage detection signals that were acquired.

2. A discharge lamp ignition device as described in claim 1, in which, when the target lamp current signal is generated by the target lamp current signal generation circuit, the target lamp current signal generation circuit is adapted to delay refreshing of the target lamp current signal until after a period at least as long as the color order cycle of the dynamic color filter and a previously refreshed value is stored during said period until the value is again refreshed.

3. A discharge lamp ignition device as described in claim 2, in which, at the time of refreshing of the target lamp current signal, there is a gradual change from the stored value to the refreshed value.

4. A discharge lamp ignition device as described in claim 2, in which the target lamp current signal generation circuit is adapted to skip a refreshing operation in the event that the difference between the stored value and the value to be refreshed is at or below a minimum value.

5. A discharge lamp ignition device as described in claim 1, further comprising an inverter to reverse the polarity of the voltage impressed on the discharge lamp and provide an alternating current driving of the discharge lamp, and wherein circuit means are provided for causing the lamp voltage detection signal to be acquired in synchronization with the timing of polarity reversal by the inverter when the lamp voltage detection signal is acquired.

6. A discharge lamp ignition device as described in claim 5, in which the voltage detection means is adapted to provide and the target lamp current signal generation circuit adapted to acquire the lamp voltage detection signal immediately prior to the timing of polarity reversal by the inverter.

7. A discharge lamp ignition device, as described in claim 1, in which the target lamp current signal generation circuit is adapted to generate the target lamp current signal on the basis of the average value of multiple acquired lamp voltage detection signals.

8. A discharge lamp ignition device as described in claim 1, in which the target lamp current signal generation circuit is adapted to generate the target lamp current signal on the basis of a maximum or minimum value of multiple acquired lamp voltage detection signals.

9. A projector that projects and displays images by using a dynamic color filter to replace the luminous flux produced by the discharge lamp with color ordered luminous flux, in which the discharge lamp ignition device for starting and lighting the discharge lamp is a discharge lamp ignition device, comprising:
   a feeder circuit to supply power to the discharge lamp,
   a voltage detection means that detects the voltage of the discharge lamp and generates a lamp voltage detection signal,
   a current detection means that detects the current of the discharge lamp and generates a lamp current detection signal,
   a target lamp current signal generation circuit that acquires the lamp voltage detection signal and generates a target lamp current signal, and
   a feeder capacity control circuit that provides feedback control of the feeder circuit so as to minimize any disparity between the target lamp current signal and the lamp current detection signal,
   wherein, at least during steady operation of the discharge lamp, the target lamp current signal generation circuit is adapted to acquire multiple lamp voltage detection signals over a period of time that is at least as long as a color order cycle of the dynamic color filter and then generate the target lamp current signal on the basis of the multiple lamp voltage detection signals that were acquired.

10. A method of starting and lighting a discharge lamp in a projector that projects and displays images using a dynamic color filter to replace the luminous flux produced by the discharge lamp with a color ordered luminous flux, using a discharge lamp ignition device comprising:
    a feeder circuit to supply power to the discharge lamp,
    a voltage detection means that detects the voltage of the discharge lamp and generates a lamp voltage detection signal,
    a current detection means that detects the current of the discharge lamp and generates a lamp current detection signal,
    a target lamp current signal generation circuit that acquires the lamp voltage detection signal and generates a target lamp current signal, and
    a feeder capacity control circuit that provides feedback control of the feeder circuit so as to minimize any disparity between the target lamp current signal and the lamp current detection signal,
    wherein, at least during steady operation of the discharge lamp, the target lamp current signal generation circuit acquires multiple lamp voltage detection signals over a period of time that is at least as long as a color order cycle of the dynamic color filter and then generates the target lamp current signal on the basis of the multiple lamp voltage detection signals that were acquired.

11. A method as described in claim 10, in which, when the target lamp current signal is generated by the target lamp current signal generation circuit, the target lamp current signal generation circuit delays refreshing of the target lamp current signal until after a period at least as long as the color order cycle of the dynamic color filter and stores a previously refreshed value during said period until the value is again refreshed.

12. A method as described in claim 11, in which, at the time of refreshing of the target lamp current signal, a gradual change from the stored value to the refreshed value occurs.

13. A method as described in claim 11, in which the target lamp current signal generation circuit skips a refreshing operation in the event that the difference between the stored value and the value to be refreshed is at or below a minimum value.

14. A method as described in claim 10, wherein an inverter reverses the polarity of the voltage impressed on the discharge lamp and provides an alternating current driving of the discharge lamp, and wherein circuit means cause the lamp voltage detection signal to be acquired in synchronization with the timing of polarity reversal by the inverter when the lamp voltage detection signal is acquired.

15. A method as described in claim 14, in which the voltage detection means provides and the target lamp current signal generation circuit acquires the lamp voltage detection signal immediately prior to the timing of polarity reversal by the inverter.

16. A method as described in claim 10, in which the target lamp current signal generation circuit generates the target lamp current signal on the basis of the average value of multiple acquired lamp voltage detection signals.

17. A method as described in claim 10, in which the target lamp current signal generation circuit generates the target lamp current signal on the basis of a maximum or minimum value of multiple acquired lamp voltage detection signals.

* * * * *